United States Patent
O'Kane et al.

(10) Patent No.: US 9,957,344 B2
(45) Date of Patent: May 1, 2018

(54) ANAEROBIC CURABLE COMPOSITIONS HAVING NOVOLAC VINYL ESTERS

(71) Applicant: Henkel IP & Holding GmbH, Duesseldorf (DE)

(72) Inventors: Ruairi O'Kane, Dublin (IE); Niamh Bergin, Dublin (IE); Brendan Kneafsey, Dublin (IE); David P. Birkett, Kildare (IE)

(73) Assignee: Henkel IP & Holding GmbH, Duesseldorf (DE)

( * ) Notice: Subject to any disclaimer, the term of this patent is extended or adjusted under 35 U.S.C. 154(b) by 0 days. days.

(21) Appl. No.: 15/495,085

(22) Filed: Apr. 24, 2017

(65) Prior Publication Data

US 2017/0226256 A1    Aug. 10, 2017

Related U.S. Application Data

(63) Continuation of application No. PCT/IB2015/002151, filed on Oct. 16, 2015.

(30) Foreign Application Priority Data

Oct. 24, 2014   (GB) .................................. 1418997.1

(51) Int. Cl.
| | |
|---|---|
| *C08F 290/06* | (2006.01) |
| *C09J 151/08* | (2006.01) |
| *C09J 5/06* | (2006.01) |
| *C08G 59/17* | (2006.01) |
| *C08G 59/16* | (2006.01) |
| *C09J 9/00* | (2006.01) |

(52) U.S. Cl.
CPC ...... *C08F 290/064* (2013.01); *C08G 59/1455* (2013.01); *C08G 59/1466* (2013.01); *C09J 5/06* (2013.01); *C09J 9/00* (2013.01); *C09J 151/08* (2013.01); *C09J 2451/00* (2013.01)

(58) Field of Classification Search
CPC ..................................................... C08F 290/06
See application file for complete search history.

(56) References Cited

U.S. PATENT DOCUMENTS

| | | | |
|---|---|---|---|
| 3,970,505 A | 7/1976 | Hauser et al. | |
| 4,755,571 A * | 7/1988 | Irving ................... | C08F 283/10 523/176 |

(Continued)

FOREIGN PATENT DOCUMENTS

| | | |
|---|---|---|
| CN | 103725243 | 4/2014 |
| DE | 1817989 A1 | 12/1976 |

(Continued)

OTHER PUBLICATIONS

Rich, R.D., "Anaerobic Adhesives" in Handbook of Adhesive Technology, A. Pizzi and K.L. Mittal, eds., Marcel Dekker, Inc., New York, 1994, 29, pp. 467-479.

(Continued)

*Primary Examiner* — Daniel H Lee
(74) *Attorney, Agent, or Firm* — Steven C. Bauman (57) ABSTRACT

The present invention relates to novolac vinyl esters useful as thermal resistance conferring components for anaerobic curable compositions, and anaerobic curable compositions having such novolac vinyl esters. The compositions are particularly useful as adhesives and sealants.

19 Claims, 1 Drawing Sheet

(56) References Cited

U.S. PATENT DOCUMENTS

| | | |
|---|---|---|
| 5,730,828 A | 3/1998 | Somemiya et al. |
| 5,811,473 A | 9/1998 | Ramos et al. |
| 6,043,327 A | 3/2000 | Attarwala et al. |
| 6,391,993 B1 | 5/2002 | Attarwala et al. |
| 6,583,289 B1 | 6/2003 | McArdle et al. |
| 6,835,782 B1 | 12/2004 | Morita et al. |
| 6,897,277 B1 | 5/2005 | Klemarczyk et al. |
| 6,958,368 B1 | 10/2005 | Klemarczyk et al. |
| 7,411,025 B1 | 8/2008 | Messana et al. |
| 8,362,112 B2 | 1/2013 | Birkett et al. |
| 8,481,659 B2 | 7/2013 | Birkett et al. |
| 9,235,121 B2 | 1/2016 | Nagoshi et al. |

FOREIGN PATENT DOCUMENTS

| | | |
|---|---|---|
| DE | 2806701 A1 | 8/1978 |
| DE | 102009047587 A1 | 7/2010 |
| EP | 0160621 A2 | 11/1985 |
| FR | 1581361 A | 9/1969 |
| GB | 1351079 A | 4/1974 |
| JP | S52124058 | 10/1977 |
| JP | S57119970 | 7/1982 |
| JP | 07-308757 A | 11/1995 |
| JP | H08295853 | 11/1996 |
| JP | H09255741 | 9/1997 |
| JP | 2012525481 | 10/2012 |
| JP | 2014139662 | 7/2014 |
| WO | 2010127053 | 11/2010 |
| WO | 2013022068 | 2/2013 |
| WO | 2015125354 | 8/2015 |

OTHER PUBLICATIONS

Baccei, L.J. and Malofsky, B.M., "Anaerobic Adhesives Containing Maleimides Having Improved Thermal Resistance" in Adhesive Chemicals, 589-601, L-H Lee, ed., Plenum Publishing Corp. (1984).

\* cited by examiner

ANAEROBIC CURABLE COMPOSITIONS HAVING NOVOLAC VINYL ESTERS

BACKGROUND

Field

The present invention relates to novolac vinyl esters useful as thermal resistance conferring components for anaerobic curable compositions, and anaerobic curable compositions having such novolac vinyl esters. The compositions are particularly useful as adhesives and sealants.

Brief Description of Related Technology

Anaerobic adhesive compositions generally are well-known. See e.g. R. D. Rich, "Anaerobic Adhesives" in *Handbook of Adhesive Technology*, 29, 467-79, A. Pizzi and K. L. Mittal, eds., Marcel Dekker, Inc., New York (1994), and references cited therein. Their uses are legion and new applications continue to be developed.

Conventional anaerobic adhesive compositions ordinarily include a free-radically polymerizable acrylate ester monomer, together with a peroxy initiator and an inhibitor component. Oftentimes, such anaerobic adhesive compositions also contain accelerator components to increase the speed with which the composition cures.

Conventional anaerobic adhesive compositions have also been conferred improved thermal properties thereupon. For instance, U.S. Pat. No. 3,988,299 (Malofsky) refers to a heat curable composition having improved thermal properties, which includes certain acrylate monomers and maleimide compounds.

L. J. Baccei and B. M. Malofsky, "Anaerobic Adhesives Containing Maleimides Having Improved Thermal Resistance" in Adhesive Chemicals, 589-601, L-H Lee, ed., Plenum Publishing Corp. (1984) report the use of maleimides—specifically, N-phenyl maleimide, m-phenylene dimaleimide and a reaction product of methylene dianiline and methylene dianiline bismaleimide—to increase the thermal resistance of anaerobic adhesives which are fully cured at temperatures of at least 150° C.

U.S. Pat. No. 6,043,327 (Attarwala) speaks to one-part, anaerobic adhesive compositions, capable of curing under ambient temperature conditions reaction products of which exhibit resistance to thermal degradation at elevated temperatures. These compositions are comprised of (a) an acrylate component; (b) a coreactant component of a specified structure, examples of which include triallyl cyanurate, triallyl trimesate, and triallyl isocyanurate; (c) a maleimide component; and (d) an anaerobic cure-inducing composition.

Notwithstanding the state of the technology, it would be desirable to provide additional choices to the end user when it comes to anaerobic curable compositions for use in high temperature environments.

SUMMARY

Provided herein is one such additional choice.

To that end, an anaerobic curable composition is provided, which includes:

(a) a (meth)acrylate component;

(b) an anaerobic cure system; and (c) a reaction product of a novolac epoxy resin and an acid of a certain structure.

The acid may be embraced by the structure below:

where R is H or CH$_3$, and X is H, C$_2$H$_4$COOH, or where Y is C$_2$H$_4$COOH or C$_2$H$_2$COOH.

The novolac epoxy resin may be a phenol or cresol formaldehyde novolac epoxy resin. The novolac epoxy resin may be embraced by the structure below:

where R is alkyl and n is 0.1 to 10, such as 0.5 to 5.

In other instances, the novolac epoxy resin may be embraced by the structure below:

where R'' is a direct bond, CH$_2$, C(CH$_3$)$_2$, SO$_2$, (CH$_3$)$_2$C—C$_6$H$_4$—C(CH$_3$)$_2$ or O; R''' is alkyl; and n is 2 to 10.

Also provided herein is a method of preparing an anaerobic curable composition. This method comprises mixing a meth(acrylate) component, an anaerobic cure system and the novolac vinyl ester, described herein.

Also provided herein is a method of bonding two or more substrates. This method comprises providing two or more substrates; dispensing onto a surface of at least one of the two or more substrates the so described anaerobic curable composition; contacting the surfaces of the two or more substrates having the anaerobic curable composition thereon; and exposing the anaerobic curable composition to anaerobic curing conditions.

Still also provided herein is a reaction product of the inventive anaerobic curable composition.

DETAILED DESCRIPTION

As noted above, an anaerobic curable composition is provided, which includes:

(a) a (meth)acrylate component;
(b) an anaerobic cure system; and
(c) a reaction product of a novolac epoxy resin and an acid of a certain structure.

The acid may be embraced by the structure below:

where R is H or CH$_3$, and X is H, C$_2$H$_4$COOH, or where Y is C$_2$H$_4$COOH or C$_2$H$_2$COOH.

Specific examples of the acid include:

Methacrylic Acid

Hydroxy ethyl methacryl ("HEMA") Succinate

HEMA Maleate

Carboxy ethyl acrylate

The novolac epoxy resin may be a phenol or cresol formaldehyde novolac epoxy resin. The novolac epoxy resin may be embraced by the structure below:

I where R' is alkyl and n is 0.1 to 10, such as about 0.5 to 5.

In some instances, the novolac epoxy resin may be a bisphenol or biphenyl formaldehyde novolac epoxy resin, such as a bisphenol A, bisphenol F, bisphenol S, bisphenol M or bisphenol E formaldehyde novolac epoxy resin.

In other instances, the novolac epoxy resin may be embraced by the structure below:

II where R" is a direct bond, CH$_2$, C(CH$_3$)$_2$, SO$_2$, (CH$_3$)$_2$C—C$_6$H$_4$—C(CH$_3$)$_2$ or O; R''' is alkyl; and n is 2-10.

The reaction product of the novolac epoxy resin and the acid should be present in the composition in an amount within the range of about 10 to about 60 weight percent, such as about 25 to about 50 weight percent.

The (meth)acrylate component may be represented by $H_2C=CGCO_2R^3$, where G is selected from H, halogen and alkyl having from 1 to about 4 carbon atoms, and $R^3$ is selected from alkyl, cycloalkyl, alkenyl, cycloalkenyl, alkaryl, and aryl groups having from 6 to about 16 carbon atoms, with or without substitution or interruption by a silane, silicon, oxygen, halogen, carbonyl, hydroxyl, ester, carboxylic acid, urea, urethane, carbamate, amine, amide, sulfur, sulfonate and sulfone.

The (meth)acrylate component may more specifically be selected from silicone (meth)acrylates, polyethylene glycol di(meth)acrylates, tetrahydrofuran (meth)acrylates and di(meth)acrylates, hydroxyethyl (meth)acrylate, hydroxypropyl (meth)acrylate, isobornyl acrylate, hexanediol di(meth)acrylate, trimethylol propane tri(meth)acrylates, diethylene glycol di(meth)acrylates, triethylene glycol di(meth)acrylates, tetraethylene diglycol di(meth)acrylates, diglycerol tetra(meth)acrylates, tetramethylene di(meth)acrylates, ethylene di(meth)acrylates, neopentyl glycol di(meth)acrylates, bisphenol-A-(meth)acrylates, ethoxylated bisphenol-A-(meth)acrylates, bisphenol-F-(meth)acrylates, ethoxylated bisphenol-F-(meth)acrylates, bisphenol-A di(meth)acrylates, ethoxylated bisphenol-A-di(meth)acrylates, bisphenol-F-di(meth)acrylates, and ethoxylated bisphenol-F-di(meth)acrylates.

Other suitable (meth)acrylate monomers include polyacrylate esters represented by where $R^4$ here is a radical selected from hydrogen, halogen, and alkyl of from 1 to about 4 carbon atoms; q is an integer equal to at least 1, and preferably equal to from 1 to about 4; and X is an organic radical containing at least two carbon atoms and having a total bonding capacity of q plus 1. With regard to the upper limit for the number of carbon atoms in X, workable monomers exist at essentially any value. As a practical matter, however, a general upper limit is about 50 carbon atoms, preferably 30, and most preferably about 20.

For example, X can be an organic radical represented by:

where each of $Y^1$ and $Y^2$ is an organic radical, preferably a hydrocarbon group, containing at least 2 carbon atoms, and preferably from 2 to about 10 carbon atoms, and Z is an organic radical, preferably a hydrocarbon group, containing at least 1 carbon atom, and preferably from 2 to about 10 carbon atoms.

Other useful (meth)acrylate monomers are reaction products of di- or tri-alkylolamines (e.g., ethanolamines or propanolamines) with acrylic acids, such as are disclosed in French Patent No. 1,581,361.

Examples of useful (meth)acrylic ester oligomers include those having the following general formula:

where $R^5$ here represents a radical selected from hydrogen, halogen, lower alkyl of from 1 to about 4 carbon atoms, hydroxy alkyl of from 1 to about 4 carbon atoms, and where $R^4$ here is a radical selected from hydrogen, halogen, and lower alkyl of from 1 to about 4 carbon atoms; $R^6$ is a radical selected from hydrogen, hydroxyl, and m is an integer equal to at least 1, e.g., from 1 to about 15 or higher, and preferably from 1 to about 8; n is an integer equal to at least 1, e.g., 1 to about 40 or more, and preferably between about 2 and about 10; and p is 0 or 1.

Examples of such (meth)acrylic ester oligomers include di-, tri- and tetraethyleneglycol dimethacrylate; di(pentamethyleneglycol)dimethacrylate; tetraethyleneglycol diacrylate; tetraethyleneglycol di(chloroacrylate); diglycerol diacrylate; diglycerol tetramethacrylate; butyleneglycol dimethacrylate; neopentylglycol diacrylate; and trimethylolpropane triacrylate.

Monofunctional (meth)acrylate esters may also be used, such as those having a polar group. The polar group in this case may be selected from labile hydrogen, heterocyclic ring, hydroxy, amino, cyano, and halo groups. Examples of compounds within this category are cyclohexyl methacrylate, tetrahydrofurfuryl methacrylate, hydroxyethyl acrylate, HEMA, hydroxypropyl methacrylate ("HPMA"), t-butylaminoethyl methacrylate, cyanoethylacrylates, aminoethyl methacrylate, aminopropyl methacrylate, hydroxyhexyl acrylate, t-butylaminoethyl methacrylate, hydroxyoctyl methacrylate and chloroethyl methacrylate.

Another useful class of (meth)acrylate monomers is prepared by the reaction of a monofunctionally substituted alkyl or aryl (meth)acrylate ester containing an active hydrogen atom on the functional substituent. This monofunctional, (meth)acrylate-terminated material is reacted with an organic polyisocyanate in suitable proportions so as to convert all of the isocyanate groups to urethane or ureido groups. The monofunctional alkyl and aryl (meth)acrylate esters are preferably the acrylates and methacrylates containing hydroxy or amino functional groups on the nonacrylate portion thereof. (Meth)acrylate esters suitable for use have the formula where X is selected from —O— and and R⁹ is selected from hydrogen and lower alkyl of 1 through 7 carbon atoms; $R^7$ is selected from hydrogen, halogen (such as chlorine) and methyl and ethyl radicals; and $R^8$ is a divalent organic radical selected from lower alkylene of 1 through 8 carbon atoms, phenylene or naphthylene. These groups upon proper reaction with a polyisocyanate, yield:

where n is an integer from 2 to about 6; B is a polyvalent organic radical selected from alkyl, alkenyl, cycloalkyl, cycloalkenyl, aryl, aralkyl, alkaryl or heterocyclic radicals both substituted and unsubstituted; and $R^7$, $R^8$ and X have the meanings given above.

The (meth)acrylate component should be present in the composition in an amount within the range of about 15 to about 65 percent, such as about 25 to about 50 percent.

The anaerobic cure system comprises one or more of saccharin, toluidines, such as N,N-diethyl-p-toluidine ("DE-p-T") and N,N-dimethyl-o-toluidine ("DM-o-T"), and acetyl phenylhydrazine ("APH") with maleic acid. See e.g. U.S. Pat. No. 3,218,305 (Krieble), U.S. Pat. No. 4,180,640 (Melody), U.S. Pat. No. 4,287,330 (Rich) and U.S. Pat. No. 4,321,349 (Rich).

Examples of other curatives for anaerobic curable compositions include thiocaprolactam (e.g., U.S. Pat. No. 5,411,988) and thioureas [e.g., U.S. Pat. No. 3,970,505 (Hauser) (tetramethyl thiourea), German Patent Document Nos. DE 1 817 989 (alkyl thioureas and N,N'-dicyclohexyl thiourea) and 2 806 701 (ethylene thiourea), and Japanese Patent Document No. JP 07-308,757 (acyl, alkyl, alkylidene, alkylene and alkyl thioureas)], certain of the latter of which had been used commercially up until about twenty years ago.

U.S. Pat. No. 6,897,277 (Klemarczyk) provides an anaerobic curable composition based on a (meth)acrylate component with an anaerobic cure-inducing composition substantially free of saccharin and an anaerobic cure accelerator compound within the following structure where R is selected from hydrogen, halogen, alkyl, alkenyl, hydroxyalkyl, hydroxyalkenyl, carboxyl, and sulfonato, and $R^1$ is selected from hydrogen, alkyl, alkenyl, hydroxyalkyl, hydroxyalkenyl, and alkaryl, an example of which is phenyl glycine and N-methyl phenyl glycine.

U.S. Pat. No. 6,958,368 (Messana) provides an anaerobic curable composition. This composition is based on a (meth) acrylate component with an anaerobic cure-inducing composition substantially free of saccharin and within the following structure where Y is an aromatic ring, optionally substituted at up to five positions by $C_{1-6}$ alkyl or alkoxy, or halo groups; A is C=O, S=O or O=S=O; X is NH, O or S and Z is an aromatic ring, optionally substituted at up to five positions by $C_{1-6}$ alkyl or alkoxy, or halo groups, or Y and Z taken together may join to the same aromatic ring or aromatic ring system, provided that when X is NH, o-benzoic sulfimide is excluded from the structure. Examples of the anaerobic cure accelerator compound embraced by the structure above include 2-sulfobenzoic acid cyclic anhydride, and 3H-1,2-benzodithiol-3-one-1,1-dioxide.

Another useful cure component in anaerobic curable compositions is tetrahydroquinoline ("THQ"). Recently, Henkel Corporation has demonstrated the efficacy of new cure accelerators. The first class is within the structure below where X is H, $C_{1-20}$ alkyl, $C_{2-20}$ alkenyl, or $C_{7-20}$ alkaryl, any of the latter three of which may be interrupted by one or more hereto atoms or functionalized by one or more groups selected from —OH, —NH₂ or —SH, or X and Y taken together form a carbocyclic ring having from 5-7 ring atoms; Z is O, S, or NX', where X' is H, $C_{1-20}$ alkyl, $C_{2-20}$ alkenyl, or $C_{7-20}$ alkaryl, any of the latter three of which may be interrupted by one or more hereto atoms or functionalized by one or more groups selected from —OH, —NH₂ or —SH; R is optional but when present may occur up to 3 times on the aromatic ring and when present is $C_{1-20}$ alkyl, $C_{2-20}$ alkenyl, or $C_{7-20}$ alkaryl, any of the latter three of which may be interrupted by one or more hereto atoms or functionalized by one or more groups selected from —OH, —NH₂ or —SH; and n is 0 and 1 and z is 1-3, provided that when X is H, z is not 2 and is preferably 1. More specifically, THQ-based or indoline-based adducts may be embraced thereby. (See U.S. Pat. No. 8,481,659.)

The second class is within the structure below where X is $C_{1-20}$ alkyl, $C_{2-20}$ alkenyl, or $C_{7-20}$ alkaryl, any of which may be interrupted by one or more hereto atoms, and which are functionalized by at least one and preferably at least two groups selected from —OH, —NH₂ or —SH and z is 1-3. (See U.S. Pat. No. 8,362,112.)

The anaerobic cure system should be present in an amount between about 1 and 10 percent by weight, based on the total weight of the composition.

For instance, examples of useful components in the anaerobic cure system include:

(i) arylamines of the formula:

in which $R_1'$ is an optionally substituted aryl radical, more especially an optionally alkyl-substituted phenyl radical, $R_2'$ has the same meaning as or is an optionally substituted, linear or branched alkyl radical and $R_3'$ is a linear or branched alkyl radical which may be substituted, but contains at least one hydrogen atom in the alpha-position to the nitrogen and any two of $R_1'$, to $R_3'$, may together form a mono- or poly-cyclic ring structure, which may optionally be a fused ring structure, and which in turn may be substituted;

(ii) a compound having the formula:

where $R_4'$ is phenyl substituted with $C_1$-$C_4$ alkyl group and $R_5'$ is selected from hydrogen, alkyl, cycloalkyl, alkenyl, cycloalkenyl, aryl, alkoxy, aryloxy, carbonyl, amino and the following groups:

where $R_7'$ is selected from alkyl groups containing one to about 10 carbon atoms;

(iii) sulphonyl hydrazines; or (iv) hydropyridines.

Additional useful accelerators include sulfinimides and oxygen and sulfur derivatives thereof such as described in U.S. Pat. No. 6,958,368 (Klemarczyk); phenylgycines and derivatives thereof, 1,4-aminobenzoyl compounds, and phenyl pyrazolinones such as disclosed in U.S. Pat. No. 7,411,025 (Messana); sulfonimide derivatives and sulfonamide derivatives as disclosed in U.S. Pat. No. 7,411,005 (Messana); trithiadiaza pentalenes as described in U.S. Pat. No. 6,583,289 (McArdle); the reaction product of succinic anhydride and phenyl hydrazine ("SPH"), which can be prepared according to U.S. Pat. No. 6,835,782 (Morita); and compounds including the —C(=O)—NH—NH— linkage together with an organic acid functional group on the same molecule, as disclosed in U.S. Pat. No. 6,835,762 (Klemarczyk).

Additional components have from time to time been included in traditional anaerobic curable compositions to alter the physical properties of either the anaerobic curable compositions or the reaction products thereof.

For instance, one or more diluent components reactive at elevated temperature conditions, mono- or poly-hydroxyalkanes, polymeric plasticizers, and chelators (see U.S. Pat. No. 6,391,993, the disclosure of which is hereby expressly incorporated herein by reference) may be included to modify the physical property and/or cure profile of the formulation and/or the strength or temperature resistance of the cured adhesive.

When used, the reactive diluent, plasticizer, and/or mono- or poly-hydroxyalkanes, may be present in an amount within the range of about 1 percent to about 30 percent by weight, based on the total weight of the anaerobic curable composition.

Stabilizers and inhibitors (such as phenols including hydroquinones and tetrahydroquinones and quinones, such as napthoquinone and anthraquinone) may also be employed to control and prevent premature peroxide decomposition and polymerization of the composition of the present invention, as well as chelating agents (such as the tetrasodium salt of ethylenediamine tetraacetic acid ("EDTA") and beta keto esters) to trap trace amounts of metal contaminants therefrom. When used, chelators may ordinarily be present in the compositions in an amount from about 0.001 percent by weight to about 0.1 percent by weight, based on the total weight of the anaerobic curable composition.

Metal catalyst solutions or pre-mixes thereof are used in amounts of about 0.03 to about 0.1 percent by weight. Other agents such as thickeners, non-reactive plasticizers, fillers, toughening components (such as elastomers and rubbers), and other well-known additives may be incorporated therein where the art-skilled believes it would be desirable to do so.

Also provided herein is a method of preparing an anaerobic curable composition. This method comprises mixing a meth(acrylate) component, an anaerobic cure system and the reaction product or adduct, described herein.

Also provided herein is a method of bonding two or more substrates. This method comprises providing two or more substrates; dispensing onto a surface of at least one of the two or more substrates the so described anaerobic curable composition; contacting the surfaces of the two or more substrates having the anaerobic curable composition thereon; and exposing the anaerobic curable composition to anaerobic curing conditions.

More specific representations of the reaction product of a novolac epoxy resin and an acid include novolac vinyl esters, which may be represented by the following two structures

IA where R' is alkyl; n is 0.5-10; and X' is O, $C_2H_4COO$, or where Y' is $C_2H_4COO$ or $C_2H_2COO$; and

IIA where R" is a direct bond, $CH_2$, $C(CH_3)_2$, $SO_2$, $(CH_3)_2C-C_6H_4-C(CH_3)_2$ or O; R'" is alkyl; n is 2-10; and X' is O, $C_2H_4COO$, or where Y' is $C_2H_4COO$ or $C_2H_2COO$.

A particularly desirable representation of the novolac vinyl ester of structure IIA has R'" being not present; X' being O; R" being $C(CH_3)_2$; and n being 6.

And still also provided is a reaction product of the inventive anaerobic adhesive composition.

The present invention also provides methods of preparing and using the inventive anaerobic curable compositions.

The anaerobic curable compositions may be prepared using conventional methods which are well known to those persons of skill in the art. For instance, the components of the inventive compositions may be mixed together in any convenient order consistent with the roles and functions the components are to perform in the compositions.

The anaerobic curable compositions may be applied to a variety of substrates to perform with the desired benefits and advantages described herein. For instance, appropriate substrates may be constructed from steel, brass, copper, aluminum, zinc, glass and other metals and alloys, ceramics and thermosets. An appropriate primer may be applied to a surface of the chosen substrate to enhance cure rate. See e.g. U.S. Pat. No. 5,811,473 (Ramos). One particularly desirable use of the compositions disclosed herein is as a threadlocker, i.e., to secure a nut to a bolt. This is achieved by applying the composition to the threads of a bolt, mating it with a nut and allowing it to cure.

Curing can occur over a wide range of times depending on specific composition, application and application geometry, and whether elevated temperature is applied. Under anaerobic compositions at ambient temperature, the cure speed can vary from minutes (very fast) to days (very slow).

In addition, this invention provides a method of preparing an anaerobic curable composition, a step of which includes mixing together a (meth)acrylate component and an anaerobic cure system described above.

The invention also provides for an article prepared from the anaerobic curable compositions described herein.

The invention also provides a method of bonding two or more substrates using the anaerobic adhesive compositions of the present invention, the steps of which include applying the composition to a desired substrate surface and exposing the composition to an anaerobic environment for a time sufficient to cure the composition.

EXAMPLES

Novolac Vinyl Ester Preparation

Here, the reaction products are prepared from one of methacrylic acid, HEMA succinate, HEMA maleate or carboxy ethyl acrylate, and a novolac epoxy resin using a suitable catalyst, such as triphenyl phosphine, in an amount of about 1 weight percent.

More specifically, various commercially available novolac epoxies with functionalities ranging from 2 to 8 (from Momentive and Dow) were reacted with an equivalent weight of methacrylic acid. The reaction was carried out either (1) solvent free or (2) in a (meth)acrylate monomers as reactive diluents—tricyclodecane dimethacrylate (TCD DMA), dimethylolpropane tetraacrylate (SR355), ethoxylated bisphenol A dimethacrylate (E2BADMA). NVE1, NVE2 and NVE 3 were prepared using the reactive diluents listed, respectively. The reaction proceeded using triphenyl phosphine as a catalyst-when heated to a temperature between about 60-90° C., ordinarily about 80° C.

The reaction was followed by FT-IR, and was confirmed to be complete once the peak at 915 $cm^{-1}$ corresponding to the epoxy ring had disappeared indicating the complete substitution of all the epoxy groups.

Adhesive Formulations

The anaerobic curable compositions were prepared with the novolac vinyl ester, a (meth)acrylate component, and an anaerobic cure system of saccharin, acetylphenyl hydrazine, maleic acid, metal chelator and radical initiator (such as peroxide, hydroperoxide, or perester).

Table 1 shows anaerobic curable compositions prepared using novolac vinyl ester reaction products made in accordance with the synthetic procedure above.

TABLE 1

| Material | Weight % |
| --- | --- |
| Tricyclodecane Dimethacrylate | 25.00 |
| Hydroxyethyl Methacrylate | 12.00 |
| Disodium EDTA solution | 0.70 |
| Maleic Acid | 0.65 |
| Saccharin | 0.95 |

TABLE 1-continued

| Material | Weight % |
| --- | --- |
| Acetyl Phenyl Hydrazine | 0.55 |
| Propoxylated Bisphenol A Fumarate | 10.00 |
| Cumene Hydroperoxide | 1.00 |
| NVE | 49.15 |

Sample No. 1 was prepared with the NVE being NVE 1. Sample Nos. 2 and 3 contained NVE 2 and NVE 3, respectively, in the same amount.

Thermal Performance

The anaerobic curable compositions so formulated were evaluated on zinc phosphate nuts and bolts pre-torqued to 5N·m. The compositions were heated and evaluated at temperatures up to 300° C. The samples containing a novolac vinyl ester reaction product provided excellent performance. Performance was measured by breakaway torque values in accordance with ISO 10123, where measurements were made at elevated temperatures (hot strengths), data for which is captured in Table A below and shown in FIG. 1.

TABLE A

Figure 1:
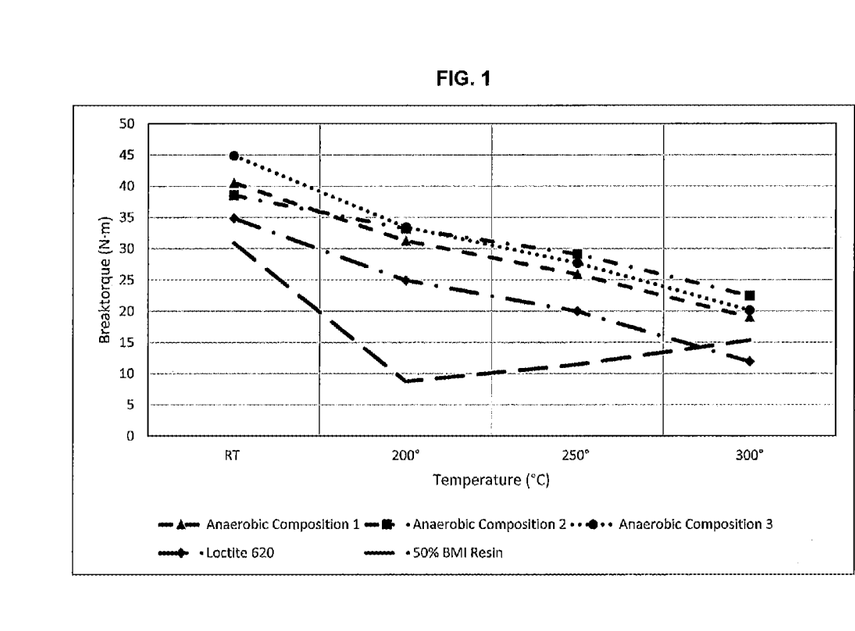
FIG. 1 illustrates hot strength performance of three novolac vinyl esters in a model anaerobic curable composition, compared with LOCTITE 620 and an anaerobic curable composition using 50% of N,N'-1,3-phenylene bis-maleimide as a representative bismaleimide resin, when measured on M10 pretorqued (5N·m) zinc phosphate nuts and bolts. In each case the anaerobic curable composition was cured for 1 week at ambient temperature. The novolac vinyl ester-containing anaerobic curable composition exhibited superior hot strength performance at elevated temperatures, here up to 300° C., compared with the two controls.

| Sample Identification | Temperature/BT (N · m) | | | |
| --- | --- | --- | --- | --- |
| | RT | 200° C. | 250° C. | 300° C. |
| Sample No. 1 | 40.52 | 31.24 | 25.9 | 19.04 |
| Sample No. 2 | 38.54 | 33.2 | 29.14 | 22.46 |
| Sample No. 3 | 44.86 | 33.44 | 27.7 | 20.16 |
| LOCTITE 620 | 34.84 | 24.92 | 19.98 | 11.92 |
| 50% BMI Resin | 30.92 | 8.76 | 11.46 | 15.36 |

Figure 2:
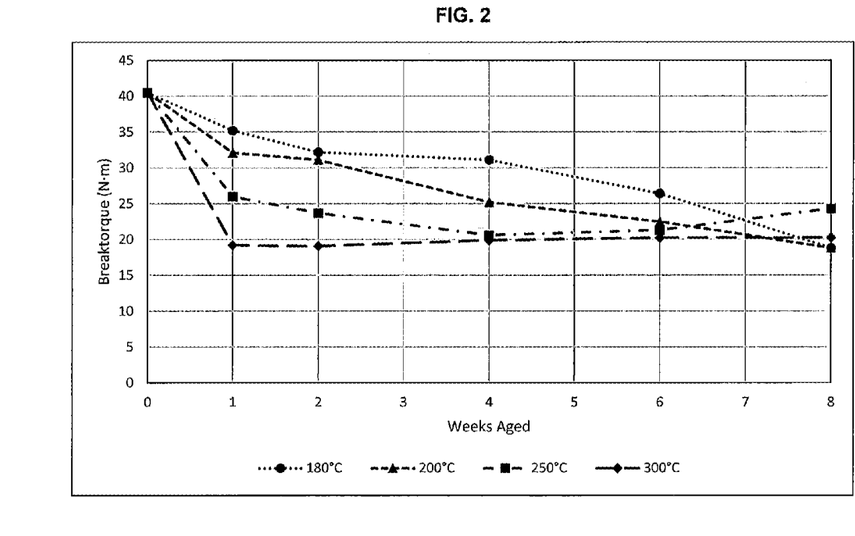
FIG. 2 illustrates heat aging performance of a novolac vinyl ester-containing anaerobic curable composition (Sample No. 3), when measured on M10 pretorqued zinc phosphate nuts and bolts. The anaerobic curable composition was cured for 1 week at ambient temperature and the bonded nut and bolt assembly aged over the time and at the temperature shown, allowed to cool to ambient temperature and the break torques measured. The novolac vinyl ester-containing anaerobic curable composition exhibited excellent performance even when aged at elevated temperatures between 180° C. up to 300° C., even out to 8 weeks of aging at that temperature.

In addition, following aging at elevated temperatures, the nuts/bolts assemblies bonded with Sample No. 3 were allowed to cool to ambient temperatures and evaluated at that temperature (heat aging), data for which is captured in Table B and shown in FIG. 2.

TABLE B

| Temperature | Weeks Aged @ T/BT (N · m) | | | | | |
| --- | --- | --- | --- | --- | --- | --- |
| | 0 | 1 | 2 | 4 | 6 | 8 |
| 180° C. | 40.5 | 35.2 | 32.2 | 31.1 | 26.42 | 18.82 |
| 200° C. | 40.5 | 32.1 | 31.1 | 25.2 | 22.48 | 18.82 |
| 250° C. | 40.5 | 26 | 23.7 | 20.6 | 21.3 | 24.3 |
| 300° C. | 40.5 | 19.2 | 19.1 | 19.9 | 20.24 | 20.26 |

The hot strength and heat aging performance was superior to that achieved with traditional high temperature additives for anaerobic curable compositions, such as bismaleimide compounds, used for instance in LOCTITE 620.

What is claimed is:

1. An anaerobic curable composition comprising:
   (a) a (meth)acrylate component;
   (b) an anaerobic cure system; and
   (c) a reaction product of a novolac epoxy resin and an acid embraced by the structure below:

wherein R is H or CH$_3$; X is H, C$_2$H$_4$COOH, or wherein Y is C$_2$H$_4$COOH or C$_2$H$_2$COOH.

2. The composition of claim 1, wherein the novolac epoxy resin is a phenol or cresol formaldehyde novolac epoxy resin.

3. The composition of claim 1, wherein the novolac epoxy resin is embraced by the structure below:

wherein R' is alkyl and n is 0.5 to 10.

4. The composition of claim 3, wherein R' is CH$_3$.

5. The composition of claim 1, wherein the novolac epoxy resin is a bisphenol or biphenyl formaldehyde novolac epoxy resin.

6. The composition of claim 1, wherein the novolac epoxy resin is a bisphenol A, bisphenol F, bisphenol S, bisphenol M or bisphenol E formaldehyde novolac epoxy resin.

7. The composition of claim 1, wherein the novolac epoxy resin is embraced by the structure below:

wherein R" is a direct bond, CH$_2$, C(CH$_3$)$_2$, SO$_2$, (CH$_3$)$_2$C—C$_6$H$_4$—C(CH$_3$)$_2$ or O; R''' is alkyl; and n is 2-10.

8. The composition of claim 7, wherein R''' is CH$_3$.

9. The composition of claim 1, wherein the reaction product of (c) is a novolac vinyl ester.

10. The composition of claim 1, wherein the (meth)acrylate component is represented by H$_2$C=CGCO$_2$R$^4$, wherein G is a member selected from the group consisting of H, halogen and alkyl having from 1 to about 4 carbon atoms, and R$^4$ is a member selected from the group consisting of alkyl, cycloalkyl, aklenyl, cycloalkenyl, alkaryl, and aryl groups having from 6 to about 16 carbon atoms, with or without substitution or interruption by a member selected from the group consisting of silane, silicon, oxygen, halogen, carbonyl, hydroxyl, ester, carboxylic acid, urea, urethane, carbamate, amine, amide, sulfur, sulonate and sulfone.

11. The composition of claim 1, wherein the (meth) acrylate component is a member selected from the group consisting of silicone (meth)acrylates, polyethylene glycol di(meth)acrylates, tetrahydrofuran (meth)acrylates and di(meth)acrylates, hydroxyethyl (meth)acrylate, hydroxypropyl (meth)acrylate, isobornyl acrylate, hexanediol di(meth)acrylate, trimethylol propane tri(meth)acrylates, diethylene glycol di(meth)acrylates, triethylene glycol di(meth)acrylates, tetraethylene diglycol di(meth)acrylates, diglycerol tetra(meth)acrylates, tetramethylene di(meth)acrylates, ethylene di(meth)acrylates, neopentyl glycol di(meth)acrylates, bisphenol-A-(meth)acrylates, ethoxylated bisphenol-A-(meth)acrylates, bisphenol-F-(meth)acrylates, ethoxylated bisphenol-F-(meth)acrylates, bisphenol-A di(meth)acrylates, ethoxylated bisphenol-A-di(meth)acrylates, bisphenol-F-di(meth)acrylates, and ethoxylated bisphenol-F-di(meth)acrylates.

12. The composition of claim 1, wherein the anaerobic cure system is present in an amount of between about 1 and 10 wt % based on the total weight of the composition.

13. The composition of claim 1, wherein the anaerobic cure system comprises one or more of saccharin, toluidines, acetyl phenylhydrazine and maleic acid.

14. A method of preparing an anaerobic curable composition, comprising mixing a meth(acrylate) component, an anaerobic cure system and the reaction product of a novolac epoxy resin and an acid embraced by the structure below:

wherein R is H or CH$_3$; X is H, C$_2$H$_4$COOH, or wherein Y is C$_2$H$_4$COOH or C$_2$H$_2$COOH.

15. A method of bonding two or more substrates, comprising:
   (a) providing two or more substrates;
   (b) dispensing onto a surface of at least one of the two or more substrates an anaerobic curable composition of claim 1;
   (c) contacting the surfaces of the two or more substrates having the anaerobic curable composition thereon; and
   (d) exposing the anaerobic curable composition to anaerobic curing conditions.

16. An article formed by bonding together of two or more substrates in according to claim 15.

17. The composition of claim 1, wherein the novolac epoxy resin is embraced by the structure below:

wherein R' is alkyl; n is 0.5-10; and X' is O, C$_2$H$_4$COO, or wherein Y' is C$_2$H$_4$COO or C$_2$H$_2$COO.

18. The composition of claim 1, wherein the novolac epoxy resin is embraced by the structure below:

wherein R" is a direct bond, CH$_2$, C(CH$_3$)$_2$, SO$_2$, (CH$_3$)$_2$C—C$_6$H$_4$—C(CH$_3$)$_2$ or O; R'" is alkyl;

n is 2-10; and X' is O, $C_2H_4COO$, or wherein Y' is $C_2H_4COO$ or $C_2H_2COO$.

19. A reaction product which is the cured reaction product formed by the anaerobic cure of the components of the composition of claim 1.

* * * * *

UNITED STATES PATENT AND TRADEMARK OFFICE
CERTIFICATE OF CORRECTION

PATENT NO. : 9,957,344 B2  
APPLICATION NO. : 15/495085  
DATED : May 1, 2018  
INVENTOR(S) : Ruairi O'Kane et al.

Page 1 of 1

It is certified that error appears in the above-identified patent and that said Letters Patent is hereby corrected as shown below:

In the Specification

Column 6, Line 46, Change "cyanoethylacrylates" to --cyanoethylacrylate--

Column 9, Line 16, Change "mention as" to --mention as $R_1'$--

In the Claims

Column 13, Line 60, Claim 1 Change the structure " 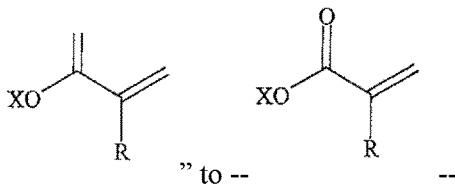 " to -- --

Column 14, Line 67, Claim 10 Change "aklenyl" to --alkenyl--

Column 15, Line 5, Claim 10 Change "sulonate" to --sulfonate--

Column 15, Line 36, Claim 14 Change the structure " 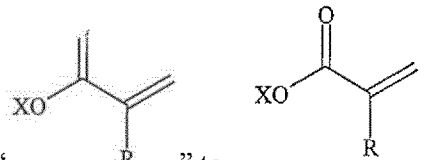 " to -- --

Signed and Sealed this  
Thirtieth Day of April, 2019

Andrei Iancu  
*Director of the United States Patent and Trademark Office*